(12) United States Patent
Kim

(10) Patent No.: US 8,142,921 B2
(45) Date of Patent: Mar. 27, 2012

(54) RECHARGEABLE BATTERY AND BATTERY MODULE

(75) Inventor: Tae-Yong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 976 days.

(21) Appl. No.: 12/126,289

(22) Filed: May 23, 2008

(65) Prior Publication Data

US 2009/0092894 A1 Apr. 9, 2009

(30) Foreign Application Priority Data

Oct. 9, 2007 (KR) .................. 10-2007-0101385

(51) Int. Cl.
 *H01M 6/42* (2006.01)
 *H01M 2/02* (2006.01)
 *H01M 2/24* (2006.01)
(52) U.S. Cl. ........ 429/160; 429/100; 429/149; 429/151; 429/157; 429/158; 429/159
(58) Field of Classification Search .......... 429/149–160
 See application file for complete search history.

(56) References Cited

U.S. PATENT DOCUMENTS

| 5,122,427 A | 6/1992 | Flowers et al. |
| 6,558,835 B1 | 5/2003 | Kurisu et al. |
| 2005/0153194 A1 | 7/2005 | Kimura et al. |

FOREIGN PATENT DOCUMENTS

| JP | P2000-138051 A | 5/2000 |
| JP | 2005-93283 | 4/2005 |
| JP | 2006-190607 | 7/2006 |
| JP | P2007-5075 A | 1/2007 |

OTHER PUBLICATIONS

SIPO Office action dated Jan. 26, 2011, for corresponding Chinese Patent application 200810132071.1, with English translation, noting reference previously filed in an IDS dated Nov. 23, 2009.

Office Action issued in corresponding European Patent Application No. 08165983.1 dated Jan. 16, 2009.

SIPO Office action dated Aug. 23, 2011 for corresponding Chinese Patent application 200810132071.1, with English translation (9 pages).

*Primary Examiner* — Patrick Joseph Ryan
*Assistant Examiner* — Ladan Mohaddes
(74) *Attorney, Agent, or Firm* — Christie, Parker & Hale, LLP

(57) ABSTRACT

A rechargeable battery having electrical stability includes an electrode assembly, a case, a cap assembly, and a spacer. The electrode assembly includes an anode, a cathode, and a separator interposed between the anode and the cathode. The case has an opening in which the electrode assembly is inserted and has a first thickness portion having a first thickness and a second thickness portion having a second thickness smaller than the first thickness. The cap assembly is coupled to the opening of the case and electrically connected to the electrode assembly. The spacer is fixed to an end of the case, and includes a supporting protrusion that engages with a portion of the case where the first thickness portion and the second thickness portion are connected to each other.

8 Claims, 7 Drawing Sheets

RECHARGEABLE BATTERY AND BATTERY MODULE

CROSS-REFERENCE TO RELATED APPLICATION

This application claims the benefit of Korean Application No. 2007-101385 filed Oct. 9, 2007, in the Korean Intellectual Property Office, the disclosure of which is incorporated herein by reference.

BACKGROUND OF THE INVENTION

1. Field of the Invention

Aspects of the present invention relate to a rechargeable battery and a battery module. More particularly, aspects of the present invention relate to a rechargeable battery and a battery module having a spacer to prevent a short circuit between rechargeable batteries.

2. Description of the Related Art

Rechargeable batteries can be repeatedly charged and discharged, unlike primary batteries, which are incapable of being recharged. A low capacity rechargeable battery composed of a single cell is generally used for portable small electronic devices, such as mobile phones, laptop computers, and camcorders. A large capacity rechargeable battery composed of a plurality of cells connected in a form of a pack is widely used to drive motors for hybrid electric vehicles.

Such a rechargeable battery is manufactured in various forms. The representative form of a rechargeable battery is a cylindrical form or a prismatic form.

Such rechargeable batteries are serially connected to form a rechargeable battery module to drive devices that require a large amount of electric power, such as motors for electric vehicles.

A rechargeable battery typically includes an electrode assembly having an anode and a cathode with a separator interposed therebetween, a case that provides a space to house the electrode assembly, and a cap assembly that closes and seals the case.

In a typical rechargeable battery formed in a cylindrical shape, an anode uncoated region and a cathode uncoated region where an active material is not coated are formed at the anode and the cathode of the electrode assembly, respectively. The anode uncoated region and the cathode uncoated region are disposed to face in different directions. A cathode current collecting plate is adhered to the cathode uncoated region, and an anode current collecting plate is adhered to the anode uncoated region. Each of the cathode current collecting plate and the anode current collecting plate is electrically connected to the case or the cap assembly to guide the current to the outside. For example, the cathode electrode current collecting plate may be electrically connected to the case, and the anode current collecting plate may be electrically connected to the cap assembly. Alternatively, the cathode electrode current collecting plate may be electrically connected to the cap assembly, and the anode current collecting plate may be electrically connected to the case.

The case acts as a cathode terminal when the cathode current collecting plate is electrically connected to the case. A cap plate of the cap assembly acts as an anode terminal when the anode current collecting plate is electrically connected to the cap assembly.

When rechargeable batteries are coupled in series, the cap plate of a first rechargeable battery is connected to the case of a second rechargeable battery adjacent to the first rechargeable battery. A spacing member may be used such that the case of the first rechargeable battery is not electrically connected to the case of the second rechargeable battery. The spacing member should be stably fixed to or attached to the case of the rechargeable battery, so that the spacing member is not separated from the case. If the spacing member is separated from the case, a short circuit may be induced between the cases of adjacent rechargeable batteries.

With respect to a rechargeable battery formed in a cylindrical shape, the cap plate is conventionally fixed to the case by a clamping process while the cap assembly is inserted to the case. Thus, the case should have a predetermined thickness to endure an appropriate clamping pressure. However, if the case is excessively thick, the weight of a battery module is high. Thus, performance of a device including the battery module may be reduced. Particularly, if a battery module is used for a movable device, such as an electric vehicle, it is desirable to reduce the weight of the battery module.

The above information disclosed in this Background section is only for the enhancement of understanding of the background of the invention and therefore it may contain information that does not form the prior art that is already known in this country to a person of ordinary skill in the art.

SUMMARY OF THE INVENTION

Aspects of the present invention provide a rechargeable battery and a battery module having a spacer stably fixed to the rechargeable battery and provide a rechargeable battery in which the strength of a part of the case is improved.

According to an embodiment of the present invention, there is provided a rechargeable battery including an electrode assembly, a case, a cap assembly, and a spacer. The electrode assembly includes an anode, a cathode, and a separator interposed between the anode and the cathode. The case has an opening into which the electrode assembly is inserted, and has a first thickness portion having a first thickness and a second thickness portion having a second thickness that is less than the first thickness. A connecting portion is between the first thickness portion and the second thickness portion. The cap assembly is coupled to the opening of the case and electrically connected to the electrode assembly. The spacer is fixed to an end of the case, and includes a supporting protrusion that engages with the connecting portion between the first thickness portion and the second thickness portion.

According to non-limiting aspects, the connecting portion between the first thickness portion and the second thickness portion may have a step configuration. The spacer may include a first spacer portion surrounding a side of the case, a second spacer portion inwardly bent from an upper end of the first spacer portion, and a third spacer portion downwardly protruding from the second portion. The supporting protrusion may protrude from an inner surface of the first spacer portion and engage with the connecting portion of the case. The case may include a clamping portion having an upper end inwardly folded and a beading portion inwardly curved below the clamping portion, the clamping portion and the beading portion fixing the cap assembly to the case. The connecting portion between the first thickness portion and the second thickness portion may be located at the clamping portion or below the beading portion. The spacer may be fixed to an upper end of the case.

Another embodiment of the present invention provides a battery module including a plurality of rechargeable batteries, each rechargeable battery comprising an electrode assembly, a case having an opening into which the electrode assembly is inserted and a cap assembly coupled to the opening of the case and electrically connected to the electrode assembly. More particularly, the battery module includes at least a first rechargeable battery and a second rechargeable battery wherein the cap assembly of the first rechargeable battery is electrically connected to the case of the second rechargeable battery in the battery module. The first rechargeable battery has a case having a first thickness portion having a first thickness, a second thickness portion having a second thickness that is less than the first thickness. The first rechargeable battery includes a spacer fixed to an end of the case of the first rechargeable battery. The spacer includes a supporting protrusion that engages with the connecting portion between the first thickness portion and the second thickness portion. According to non-limiting aspects, the connecting portion may have a stepped configuration including an edge wherein surfaces forming the edge may meet at a right angle or at an acute angle. The spacer may further include a first spacer portion surrounding a side of the case, a second spacer portion inwardly bent from an upper end of the first spacer portion, and a third spacer portion downwardly protruding from the second spacer portion. The supporting protrusion may protrude from an inner surface of the first portion and may engage with the connecting portion. The case may include a clamping portion having an upper end inwardly folded and a beading portion inwardly curved below the clamping portion, the clamping portion and the beading portion fixing the cap assembly in the case. The connecting portion may be located at the clamping portion or below the beading portion.

According to other non-limiting aspects, the battery module may further include an interconnector interposed between the first rechargeable battery and the second rechargeable battery. The interconnector may include at least one lower protrusion in contact with the cap plate of the cap assembly of the first rechargeable battery and at least one inner protrusion in contact with the case of the second rechargeable battery. The interconnector may further include a body portion and an extending portion. The body portion may surround a lower portion of the case of the second rechargeable battery, and the extending portion may protrude downwardly from the body portion. The inner protrusion may protrude inwardly from the body portion, and the lower protrusion may protrude from a bottom surface of the extending portion. The at least one inner protrusion may have a thickness that is less than a thickness in the remaining portion of the interconnector. The at least one inner protrusion may include a plurality of inner protrusions arranged to be spaced from each other along a periphery of the body portion. At least one variable elastic portion having a concave shape may be formed in the vicinity of the at least one inner protrusion.

According to another aspect of the present invention, there is provided an apparatus to stably connect a cap assembly disposed on an upper portion of a first rechargeable battery and a case of a second rechargeable battery, comprising an interconnector that includes at least one lower protrusion in contact with the cap assembly of the first rechargeable battery, and at least one inner protrusion in contact with the case of the second rechargeable battery and a spacer that is fixed to an upper end of a case of the first rechargeable battery, the spacer including a first spacer portion surrounding a side of the case of the first rechargeable battery, a second portion inwardly bent from an upper end of the first spacer portion, a third spacer portion downwardly protruding from the second portion, and a supporting protrusion that protrudes from an inner surface of the first spacer portion and engages with the connecting portion, wherein the spacer insulates the case of the first rechargeable battery from the interconnector.

According to an exemplary embodiment of the present invention, the spacer engages with the step portion formed at the connecting portion between the first thickness portion and the second thickness portion and is fixed to the case. Thus, a short circuit between rechargeable batteries can be stably prevented.

In the rechargeable battery according to an embodiment of the present invention, because an upper portion of the case is relatively thick compared with the remaining portion, the cap plate can be stably fixed to the case. Also, since the remaining portion is relatively thin, the weight of the battery module can be reduced.

In addition, in the battery module according to an embodiment of the present invention, rechargeable batteries can be more stably assembled by the interconnector interposed between the rechargeable batteries.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
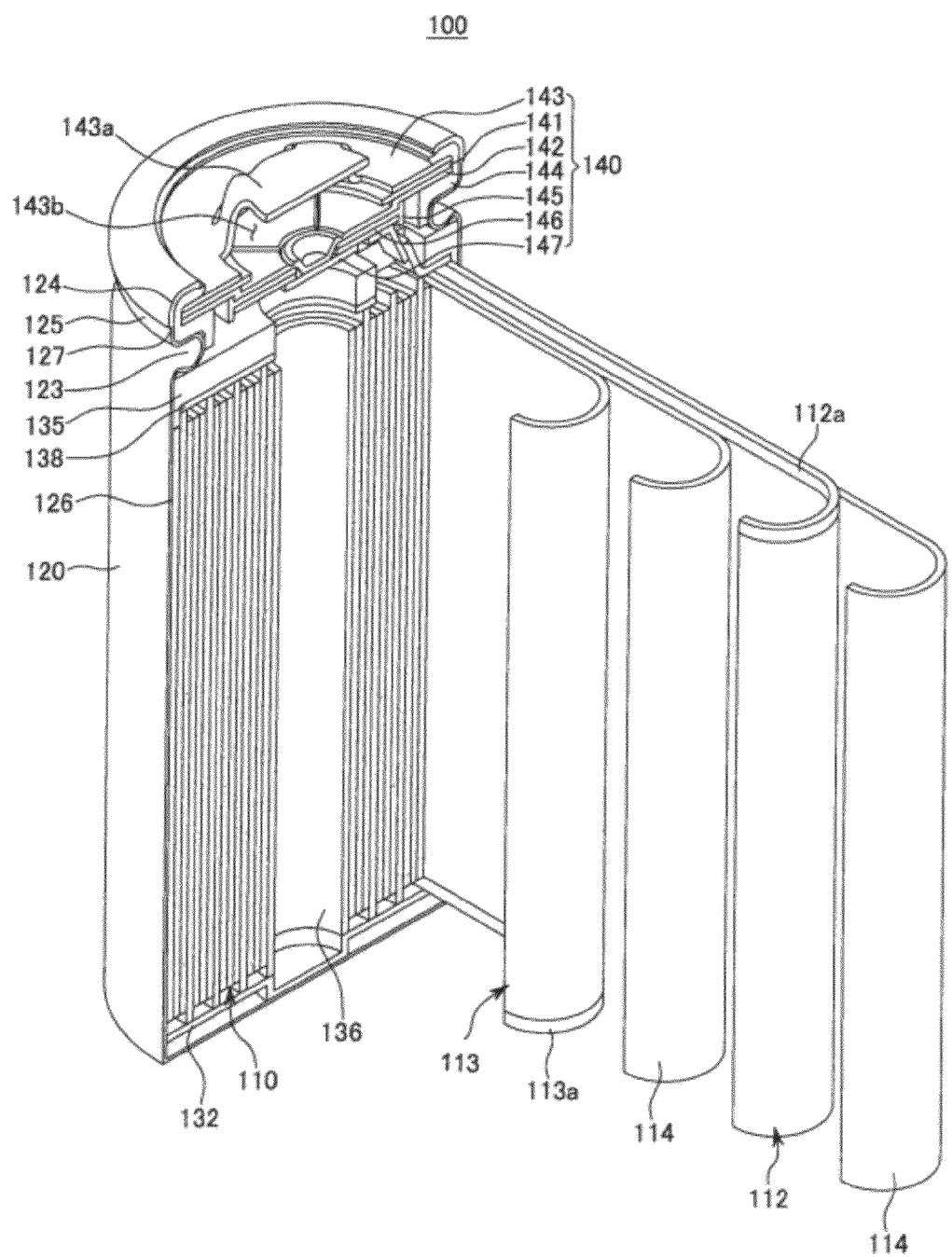
FIG. 1 is a cross-sectional perspective view of a rechargeable battery according to a first exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a cross-sectional perspective view of a rechargeable battery according 100 to an embodiment of the present invention. Referring to FIG. 1, the rechargeable battery 100 includes an electrode assembly 110 and a case 120. The electrode assembly 110 has an anode 112, a cathode 113, and a separator 114 interposed between the anode 112 and the cathode 113. The case 120 has an opening formed at one end thereof to insert the electrode assembly 110 with an electrolyte solution. The other end of the case 120 opposite to the end having the opening is closed. A cap assembly 140 is disposed at the opening of the case 120 interposing a gasket 144 therebetween. In discussing the rechargeable battery 100 herein, the terms such as "up," "upper," "upward," "above," and "top" are used in reference to the direction from the closed end of the case 120 towards the end of the case 120 having the cap assembly 140, and terms such as "down," "downward," "downwardly" "low," "lower," "below" and "bottom" are used in reference to the direction from the end of the case 120 having the cap assembly 140 towards the closed end. In other words, terms regarding orientation of components and structures of the rechargeable battery 100 are used herein from the perspective of the rechargeable battery 100 resting on its closed end. It is to be understood, of course that the rechargeable battery can be used in any orientation. Terms such as "inward" and "inwardly" refer generally to a direction toward the interior of the battery. For example, with respect to a cylindrical battery, the terms "inward" and "inwardly" refer generally to a direction toward the center axis of the battery. Similarly, terms such as "outward" and "outwardly refer generally to a direction away from the interior of the battery.

The electrode assembly 100 according to the present embodiment is formed in a cylindrical shape. That is, the separator 114, the anode 112, and the cathode 113 are sequentially stacked, and the stack is spirally rolled to form the electrode assembly 110 in a cylindrical shape. (In FIG. 1, one layer of the spirally rolled stack including the cathode 113, separator 114, anode 112 and separator 114 is shown in an extended, exploded view.) However, the electrode assembly 110 structure is not limited thereto, and can be formed variously. A center pin 136 is located in a space formed at a center of the electrode assembly 110 such that the electrode assembly 110 can maintain a cylindrical shape.

An anode uncoated region 112a, which is a region of the anode 112 that is not coated with an anode active material, is formed at an upper end of the anode 112 (that is, at the end of the anode that is adjacent to the cap assembly 140). The anode 112 is electrically connected to an anode current collecting plate 138 through the anode uncoated region 112a. A cathode uncoated region 113a, which is a region of the cathode that is not coated with a cathode active material, is formed at a lower end of the cathode 113 (that is, the end of the cathode that is an opposite end from the cap assembly 140). The cathode 113 is electrically connected to a cathode current collecting plate 132 through the cathode uncoated region 113a.

In the present embodiment, the anode current collecting plate 138 is disposed at the upper portion, and the cathode electrode current collecting plate 132 is disposed at the lower portion. However, the present invention is not limited thereto. Thus, as an alternative, the anode current collecting plate may be disposed at the lower portion, and the cathode electrode current collecting plate may be disposed at the upper portion.

The cap assembly 140 includes a cap plate 143 having a protruded outer terminal 143a and an exhaust port 143b, and a vent plate 142 disposed under the cap plate 143 to discharge gas by being broken when a predetermined pressure condition is satisfied. The vent plate 142 interrupts the electrical connection between the electrode assembly 110 and the cap plate 143 if the predetermined pressure condition occurs.

A positive temperature coefficient element 141 is disposed between the cap plate 143 and the vent plate 142. The positive temperature coefficient element 141 unlimitedly increases electrical resistance when the temperature rises above a predetermined temperature. When the rechargeable battery 100 reaches a temperature higher than a predetermined value, the positive temperature coefficient element 141 interrupts the flow of current for charging and discharging. The vent plate 142 protrudes downwardly, and a sub-plate 147 is attached at a bottom side of the protruded part.

A middle plate 146 and an insulating plate 145 are disposed at a periphery of the vent plate 142. The middle plate 146 is electrically connected to the electrode assembly 110 through a lead unit, and is fixed to the sub-plate 147. The insulating plate 145 is disposed between the middle plate 146 and the vent plate 142 to insulate the middle plate 146 from the vent plate 142.

An insulation member 135 is disposed on the anode current collecting plate 138 to insulate the anode current collecting plate 138 from the case 120. The insulation member 135 is disposed below a beading portion 123 to surround a periphery of the anode current collecting plate 138.

The case 120 is formed of a conductive metal such as steel coated with aluminum, an aluminum alloy, or nickel. The case 120 is formed in a cylindrical shape having an internal space to house the electrode assembly 110. After the cap assembly 140 is inserted into the opening of the case 120, the cap assembly 140 is secured to the case 120 through a clamping process. In the clamping process, the beading portion 123 and a clamping portion 125 are formed.

The case 120 includes a first thickness portion 124 formed at an upper portion thereof, and a second thickness portion 126 formed below the first thickness portion 124. The first thickness portion 124 has a first thickness, and the second thickness portion 126 has a second thickness that is less than the first thickness. Accordingly, the case 120 at the second thickness portion 126 has a smaller diameter than at the first thickness portion 124. Thus, a connecting portion 127, which may have a step configuration, is formed where the first thickness portion 124 and the second thickness portion 126 connect with each other. The connecting portion 127 may have an angulated edge, and surfaces forming the edge may meet at a right angle or at an acute angle.

The first thickness portion 124 is continuously formed from an upper end of the case 120 to the clamping portion 125. When the clamping process is performed, the first thickness portion 124 supports clamping pressure such that the cap assembly 140 is stably fixed to the case 120, and generation of a gap between the cap assembly 140 and the case 120 is prevented.

Figure 2:
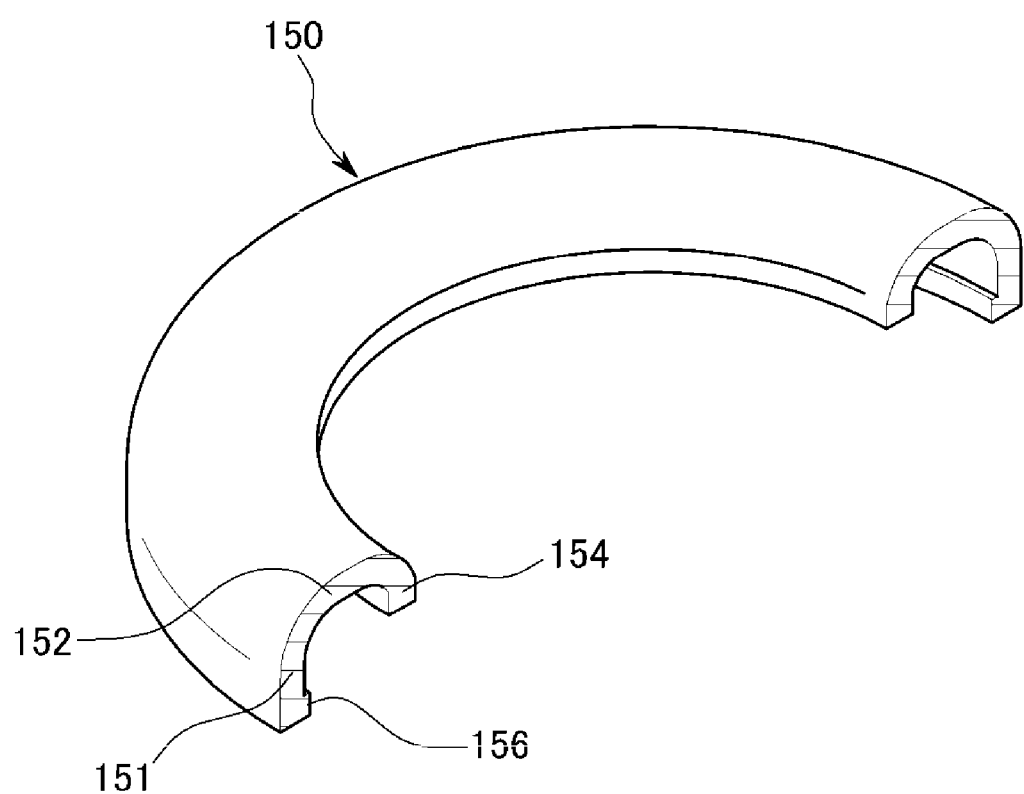
FIG. 2 is a cross-sectional perspective view of a spacer according to the first exemplary embodiment of the present invention.
Figure 3A:
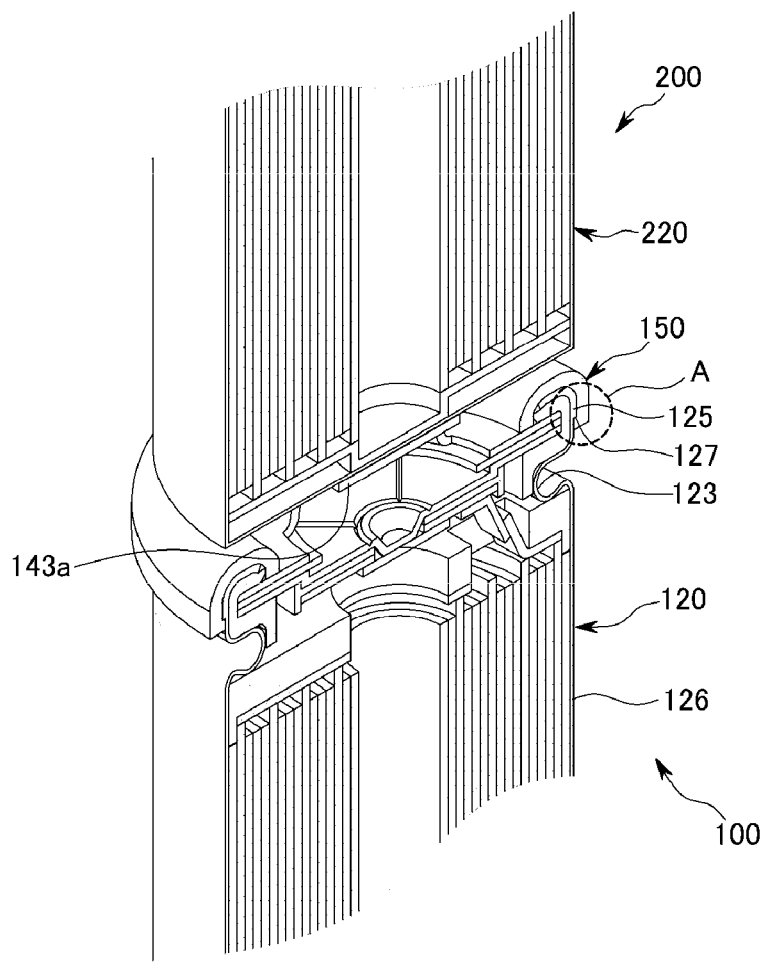
FIG. 3A is a partial cross-sectional perspective view of a battery module including the rechargeable battery with the spacer according to the first exemplary embodiment of the present invention.

FIG. 2 is a cross-sectional perspective view of a spacer disposed on the case. FIG. 3A is a cross-sectional perspective view of a battery module in a state in which the spacer is fixed to the rechargeable battery, and FIG. 3B is an enlarged cross sectional view of portion A of FIG. 3A.

Figure 3B:
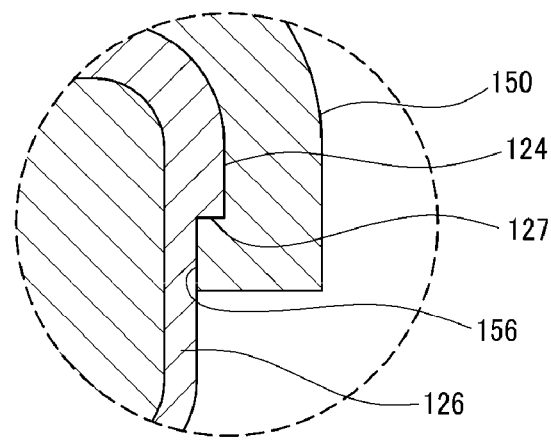
FIG. 3B is an enlarged cross sectional view of portion A of FIG. 3A.

Referring to FIGS. 2 and 3, a first rechargeable battery 100 and a second rechargeable battery 200 are coupled in series. (Herein, in FIGS. 3A, 3B, 5 and 6 showing two rechargeable batteries coupled in series, the rechargeable battery coupled through its cap portion is referred to as the first rechargeable battery 100, and the rechargeable battery coupled through its base portion is referred to as the second rechargeable battery 200. It is to be understood that the first rechargeable battery 100 and the second rechargeable battery 200 typically have identical structures. When there is no need to identify specific structures on adjacent batteries, as in FIGS. 1 and 4, the reference numeral 100 is used for each rechargeable battery, even when more than one rechargeable battery is shown. The outer terminal 143a of the first rechargeable battery 100 is in contact with the case 220 of the second rechargeable battery 200 adjacent to the first rechargeable battery 100.

If the case 120 of the first rechargeable battery 100 and the case 220 of the second rechargeable battery 200 were to come into contact with each other, an unexpected short circuit could be generated. Therefore, a spacer 150 is disposed on the first rechargeable battery 100 to prevent the short circuit between the adjacent first rechargeable battery 100 and second rechargeable battery 200. Typically, the spacer 150 comprises a material that is electrically insulating. The spacer 150 has a first portion 151, a second portion 152, and a third portion 154. The first portion 151 surrounds a side of the case 120 of the first rechargeable battery 100, the second portion 152 is bent from an upper portion of the first portion 151 and protrudes inwardly, and the third portion 154 protrudes downwardly from the second portion 152.

The third portion 154 engages with an end of the case 120 and an end of the gasket 144 of the rechargeable battery 100, and prevents the spacer 150 from separating outward or downward.

In addition, a supporting protrusion 156 is formed on and protrudes from an inner surface of the first portion 151 to engage with the step portion 127 of the rechargeable battery 100. The spacer 150 can be stably fixed to the step portion 127 by the supporting protrusion 156 formed on the spacer 150. In the present embodiment, because an edge of the step portion 127 has a pointed shape, the supporting protrusion 156 cannot be easily separated from the step portion 127 and is stably fixed to the step portion 127.

Figure 4:
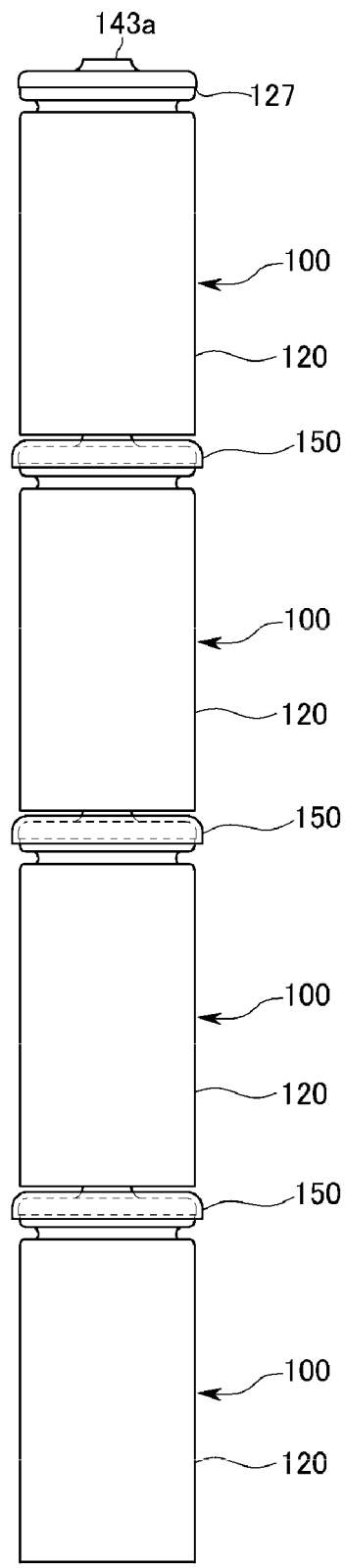
FIG. 4 is a front view of the battery module according to the first exemplary embodiment of the present invention.

FIG. 4 is a front view of a plurality of rechargeable batteries 100 according to the embodiment of FIG. 1 joined to form a battery module. As shown in FIG. 4, the spacer 150 is disposed and fixed between the rechargeable batteries 100. Thus, the cases 120 of the rechargeable batteries 100 and the outer terminals 143a can be stably in contact with each other, and a short circuit generated by contact between the cases 120 is prevented.

Figure 5:
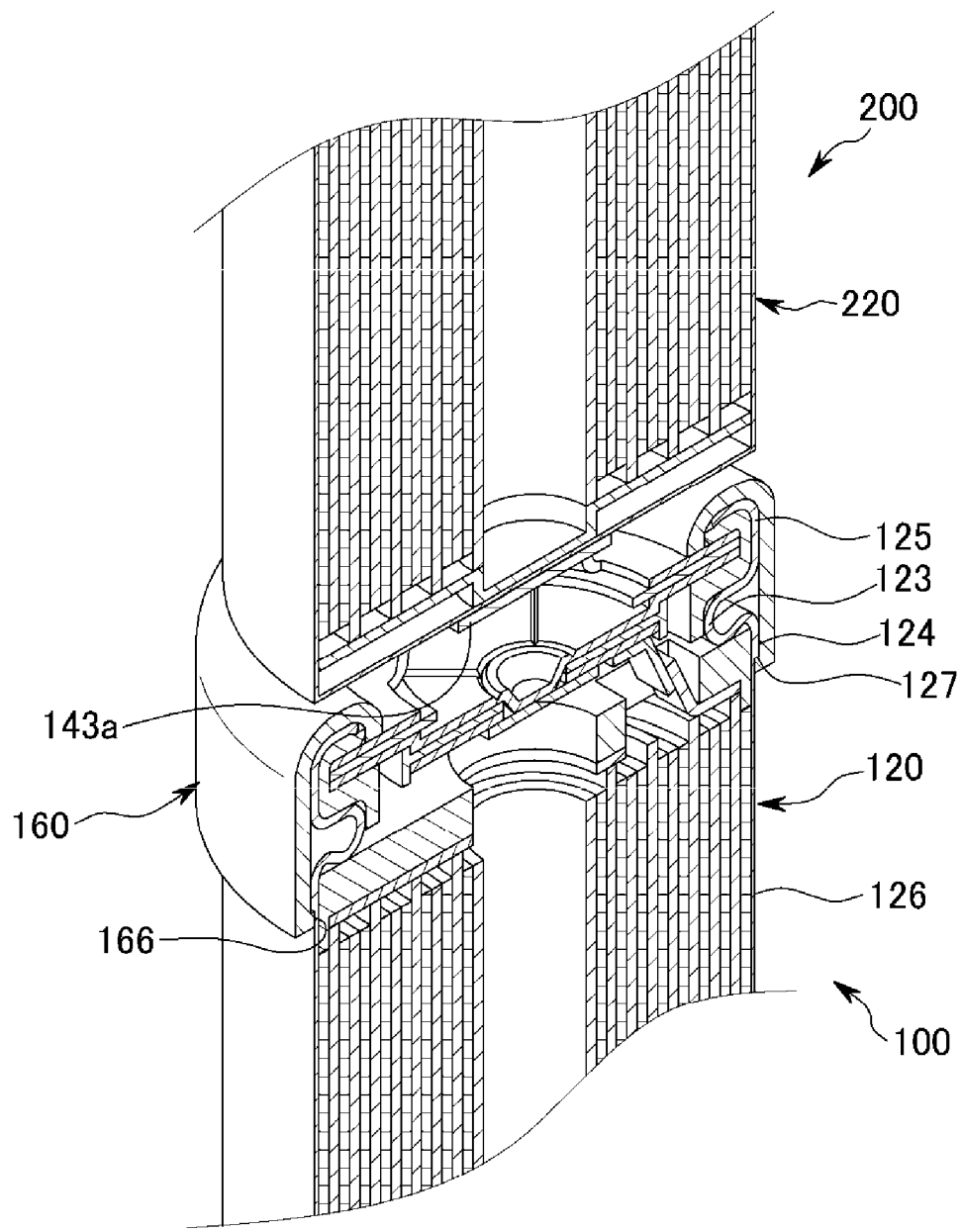
FIG. 5 is a partial cross-sectional perspective view of a battery module according to a second exemplary embodiment of the present invention.

FIG. 5 is a partial cross-sectional perspective view of a battery module according to another embodiment of the present invention. Referring to FIG. 5, a case 120 of a first rechargeable battery 100 includes a first thickness portion 124 formed at an upper portion thereof, and a second thickness portion 126 formed below the first thickness portion 124. The first thickness portion 124 has a first thickness, and the second thickness portion 126 has a second thickness smaller than the first thickness. The first thickness portion 124 is continuously formed from an upper end of the case 120 at a portion below a beading portion 123. Accordingly, a step portion 127 is formed below the beading portion 123, and a supporting protrusion 166 of a spacer 160 extends below the beading portion 123 to engage with the step portion 127.

According to the embodiment of FIG. 5, the upper end of the case 120 has increased strength because more of the upper part of the case is taken up by the first thickness portion 124. Also, since the spacer 160 is fixed below the beading portion 123, the rechargeable batteries 100 can be stably insulated from each other.

Figure 6:
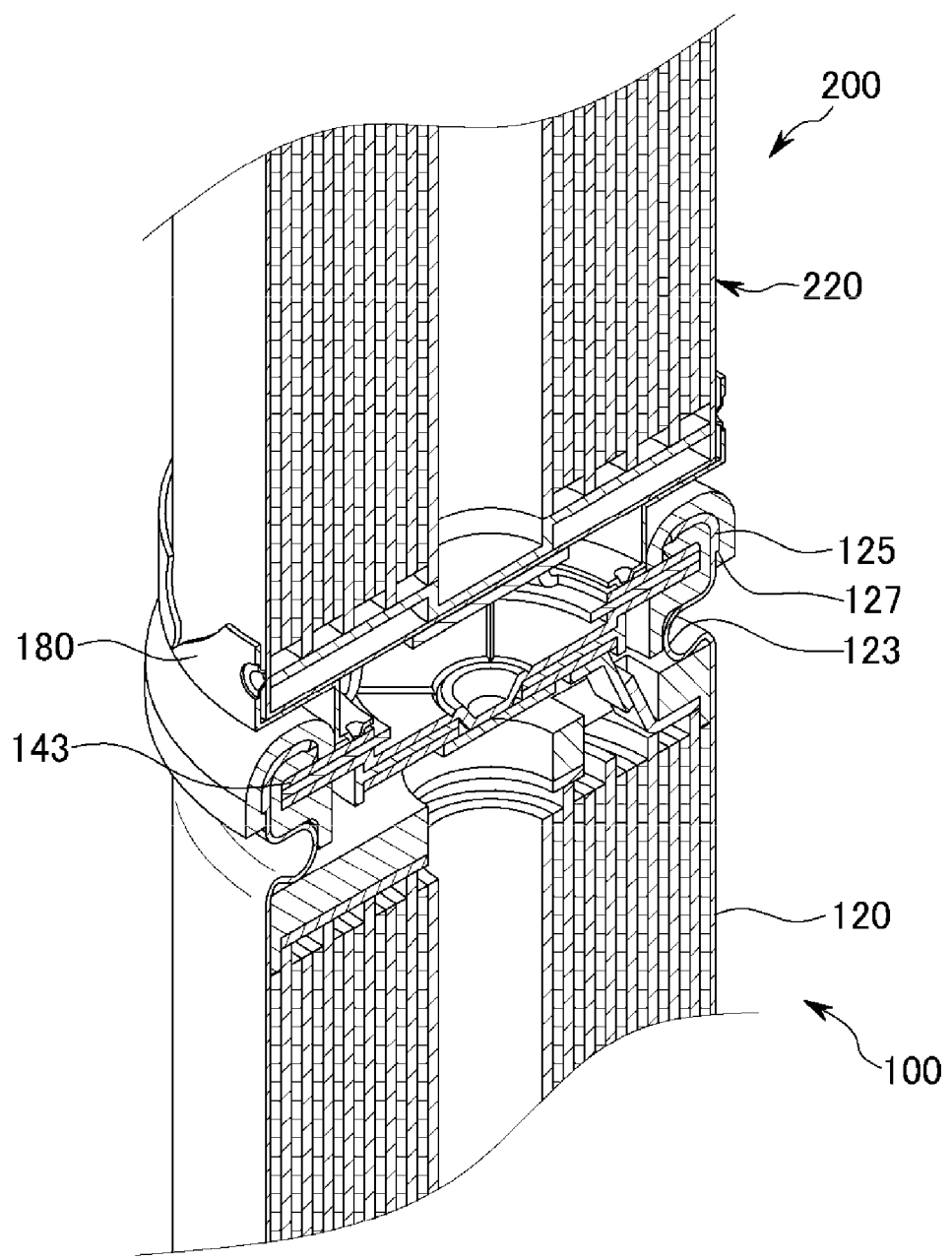
FIG. 6 is a partial cross-sectional perspective view of a battery module according to a third exemplary embodiment of the present invention.
Figure 7:
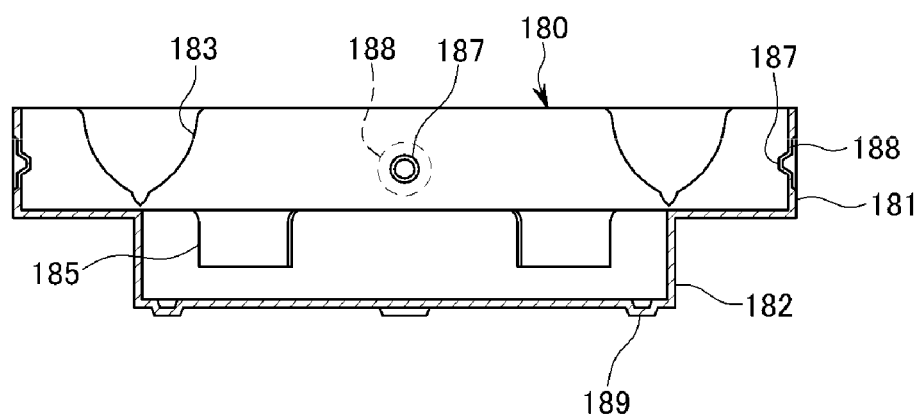
FIG. 7 is a cross-sectional view of an interconnector according to the third exemplary embodiment of the present invention.

FIG. 6 is a partial cross-sectional perspective view of a battery module according to another embodiment of the present invention, and FIG. 7 is a cross-sectional view of an interconnector according this embodiment. Referring to FIG. 6, the battery module includes an interconnector 180. The interconnector 180 is disposed between the first and second rechargeable batteries 100 and 200, and electrically connects the first rechargeable battery 100 to the second rechargeable battery 200. Typically, the interconnector comprises a material that is electrically conductive.

The interconnector 180 is in contact with the case 220 of the second rechargeable battery 200 and the cap plate 143 of the first rechargeable battery 100, and electrically connects the first rechargeable battery 100 to the second rechargeable battery 200 in series.

Referring to FIG. 7, the interconnector 180 includes a body portion 181 and an extending portion 182. The body portion 181 surrounds a lower portion of the case 220 of the second rechargeable battery 200 and has a cylindrical shape. The extending portion 182 protrudes downwardly from the body portion 181. At least one inner protrusion 187 is formed on an inner surface of the body portion 181 and is in contact with the case 220 of the second rechargeable battery 220. If there are two or more inner protrusions 187 as shown in FIG. 7, the inner protrusions 187 are arranged to be spaced from each other along an inner periphery of the body portion 181. Each inner protrusion 187 has a thickness smaller than a thickness of the remaining portion in the interconnector 180 to be elastically deformed when the inner protrusion is in contact with the second rechargeable battery 200. A variable elastic portion 188 having a concave shape is formed in the vicinity of the inner protrusions 187. At least one removed portion 183 is also formed in the body portion 181 of the interconnector 180 between the inner protrusions 187. The removed portion 183 allows the body portion 181 to be easily deformed outwardly.

Accordingly, when the interconnector 180 and the second rechargeable battery 200 are assembled by a shrink fit, the inner protrusions 187 and the at least one removed portion 183 can be elastically deformed and the second rechargeable battery 200 can be easily inserted into the interconnector 180, even if the tolerance is large.

Also, after inserting the interconnector 180 into the second rechargeable battery, the inner protrusions 187 having elasticity are in close contact with an outer periphery of the second rechargeable battery 200. Therefore, contact resistance can be decreased. In addition, in this state, the inner protrusions 187 are fixed to the second rechargeable battery 200 by resistance welding. Thus, a stable connection can be maintained.

At least one ventilation hole 185 is formed at a periphery of the extending portion 182 such that a gas generated at the first rechargeable battery 100 can be stably discharged. At least one lower protrusion 189 is formed on a bottom surface of the extending portion 182 and is in contact with a cap plate 143 of the first rechargeable battery 100.

The interconnector 180 can electrically connect the first rechargeable battery 100 to the second rechargeable battery 200. Also, a spacer 150 disposed on the case 120 of the first rechargeable battery 100 prevents the case 120 of the first rechargeable battery 100 from contacting the case 220 of the second rechargeable battery, and thus electrical stability can be ensured.

According to the present exemplary embodiments, since the interconnector 180 is disposed between the rechargeable batteries 100 and 200, the rechargeable batteries 100 and 200 can be stably assembled. Further, the interconnector 180 has the ventilation hole 185, and therefore, a gas that is generated can be stably discharged.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery comprising:
   an electrode assembly;
   a case having an opening at a first end into which the electrode assembly is inserted, the case having a first thickness portion having a first thickness, a second thickness portion having a second thickness that is less than the first thickness and a connecting portion between the first thickness portion and the second thickness portion;

a cap assembly coupled to the opening of the case and electrically connected to the electrode assembly; and a spacer fixed to the first end of the case, the spacer including a supporting protrusion that engages with the connecting portion between the first thickness portion and the second thickness portion, wherein the case includes a clamping portion at the first end that is inwardly folded, and a beading portion between the clamping portion and a second end of the case that is opposite the first end, the beading portion being inwardly curved and spaced apart from the connecting portion.

2. The rechargeable battery of claim 1, wherein the connecting portion between the first thickness portion and the second thickness portion has a stepped configuration.

3. The rechargeable battery of claim 2, wherein the case is cylindrical and wherein the case has a first diameter at the first thickness portion and a second diameter at the second thickness portion that is less than the first diameter.

4. The rechargeable battery of claim 2, wherein the spacer further includes a first spacer portion surrounding a side of the case, a second portion inwardly bent from an upper end of the first spacer portion, and a third spacer portion downwardly protruding from the second portion, and wherein the supporting protrusion protrudes from an inner surface of the first spacer portion and engages with the connecting portion.

5. A rechargeable battery comprising:

an electrode assembly;

a case having an opening into which the electrode assembly is inserted, the case having a first thickness portion having a first thickness, a second thickness portion having a second thickness that is less than the first thickness and a connecting portion between the first thickness portion and the second thickness portion;

a cap assembly coupled to the opening of the case and electrically connected to the electrode assembly; and a spacer fixed to an end of the case, the spacer including a supporting protrusion that engages with the connecting portion between the first thickness portion and the second thickness portion, wherein the connecting portion between the first thickness portion and the second thickness portion has a stepped configuration, wherein the case includes a clamping portion having an upper end that is inwardly folded and a beading portion that is inwardly curved below the clamping portion, the clamping portion and the beading portion fixing the cap assembly to the case, and wherein the connecting portion having the stepped configuration is located at the clamping portion.

6. The rechargeable battery of claim 2, wherein the clamping portion and the beading portion fix the cap assembly to the case, and wherein the connecting portion having the stepped configuration is below the beading portion.

7. The rechargeable battery of claim 1, wherein the first thickness portion is between the first end and the connecting portion.

8. The rechargeable battery of claim 1, wherein the second thickness portion having the second thickness extends from the connecting portion to the second end.

* * * * *